United States Patent
Inoue et al.

(10) Patent No.: US 9,043,496 B2
(45) Date of Patent: May 26, 2015

(54) BRIDGE CIRCUIT

(71) Applicant: KABUSHIKI KAISHA TOSHIBA, Minato-ku, Tokyo (JP)

(72) Inventors: Makoto Inoue, Kanagawa (JP); Keisuke Kudo, Aomori (JP); Takayuki Nakagawa, Kanagawa (JP); Akira Irube, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 58 days.

(21) Appl. No.: 13/779,736

(22) Filed: Feb. 27, 2013

(65) Prior Publication Data

US 2014/0032786 A1   Jan. 30, 2014

(30) Foreign Application Priority Data

Jul. 26, 2012  (JP) ................... 2012-166137

(51) Int. Cl.
*G06F 3/00* (2006.01)
*G06F 3/06* (2006.01)
*G06F 13/20* (2006.01)

(52) U.S. Cl.
CPC ............... *G06F 3/0601* (2013.01); *G06F 3/06* (2013.01); *G06F 3/0626* (2013.01); *G06F 3/0658* (2013.01); *G06F 3/0679* (2013.01); *G06F 13/20* (2013.01)

(58) Field of Classification Search
USPC .......................................................... 710/5
See application file for complete search history.

(56) References Cited

U.S. PATENT DOCUMENTS

| | | | |
|---|---|---|---|
| 7,624,216 B2 | 11/2009 | Yoshikawa et al. | |
| 2009/0024773 A1 | 1/2009 | Yoshikawa et al. | |
| 2010/0174866 A1 | 7/2010 | Fujimoto et al. | |
| 2011/0191499 A1* | 8/2011 | Andersson et al. ............... | 710/5 |

FOREIGN PATENT DOCUMENTS

| | | |
|---|---|---|
| CN | 101689246 B | 5/2012 |
| EP | 1 811 395 A1 | 7/2007 |
| JP | 2004-046498 A | 2/2004 |
| JP | 2009-026296 A | 2/2009 |
| JP | 4799417 B2 | 10/2011 |
| KR | 20100017873 A | 2/2010 |
| TW | 200917126 A | 4/2009 |
| WO | WO 2006/035738 A1 | 4/2006 |

* cited by examiner

*Primary Examiner* — Chun-Kuan Lee
(74) *Attorney, Agent, or Firm* — Holtz, Holtz, Goodman & Chick PC

(57) ABSTRACT

A bridge circuit of an embodiment includes: a command transfer portion which is configured by wired logic into which a host controller capable of sending a command that corresponds to each of a plurality of devices inputs the command, and which is configured to transfer the inputted command to the plurality of devices; a command analysis portion which is configured by wired logic, and which is configured to analyze the command from the host controller; and a response reply portion which is configured by wired logic, and which is capable of reading out a response based on an analysis result of the command analysis portion from a register that holds a response corresponding to the command and sending the response to the host controller.

15 Claims, 6 Drawing Sheets

BRIDGE CIRCUIT

CROSS-REFERENCE TO RELATED APPLICATION

This application is based upon and claims the benefit of priority from the prior Japanese Patent Applications No. 2012-166137, filed on Jul. 26, 2012; the entire contents of which are incorporated herein by reference.

FIELD

Embodiments described herein relate generally to a bridge circuit.

BACKGROUND

Various kinds of flash memory cards, for example, SD cards, are already in widespread use. SD cards have a compact and easy-to-use outer shape and size, and SD cards are becoming extensively used as recording media as a result of a considerable increase in the capacity thereof.

The specifications for SD cards are defined by the SD standards. The SD standards includes not only a standard relating to memory cards, but also a standard relating to an SDIO that is assumed as an I/O interface. Various functions such as a Bluetooth (registered trademark) function, a wireless LAN function, a one-segment tuner function, a GPS function, a digital camera function, and a PHS data communication function can be implemented by means of SD cards that are compatible with the SDIO technology. Japanese Patent Application Laid-Open Publication No. 2004-46498 discloses an information processing apparatus that has two card slots that are used for expansion cards and memory cards, and it is possible to use SD memory cards and SDIO cards in the information processing apparatus.

However, when a constraint regarding the number of card slots of a host machine is taken into account, a configuration may be considered in which a plurality of functions are provided in a single SD card, that is, an SD card can be considered that has both an SD memory function and an SDIO function. With regard that kind of SD card, an apparatus can be considered in which an SD memory controller that controls the SD memory and an SDIO controller that controls the SDIO are mounted, and which also includes a microcomputer that controls data transfer operations of the aforementioned controllers.

However, in that kind of SD card, there is a problem that a program memory for actuating the microcomputer is required and consequently the hardware scale increases, and also that a delay arises in data transfer operations because microcomputer processing is required.

DETAILED DESCRIPTION

According to one embodiment, a bridge circuit includes: a command transfer portion which is configured by wired logic and into which a host controller capable of sending a command that corresponds to each of a plurality of devices inputs the command, and which is configured to transfer the inputted command to the plurality of devices; a command analysis portion which is configured by wired logic, and which is configured to analyze the command from the host controller; and a response reply portion which is configured by wired logic, and which is capable of reading out a response based on an analysis result of the command analysis portion from a response register in which a response corresponding to the command is held and sending the response to the host controller.

Hereunder, embodiments of the present invention are described in detail with reference to the drawings.

First Embodiment

Figure 1:
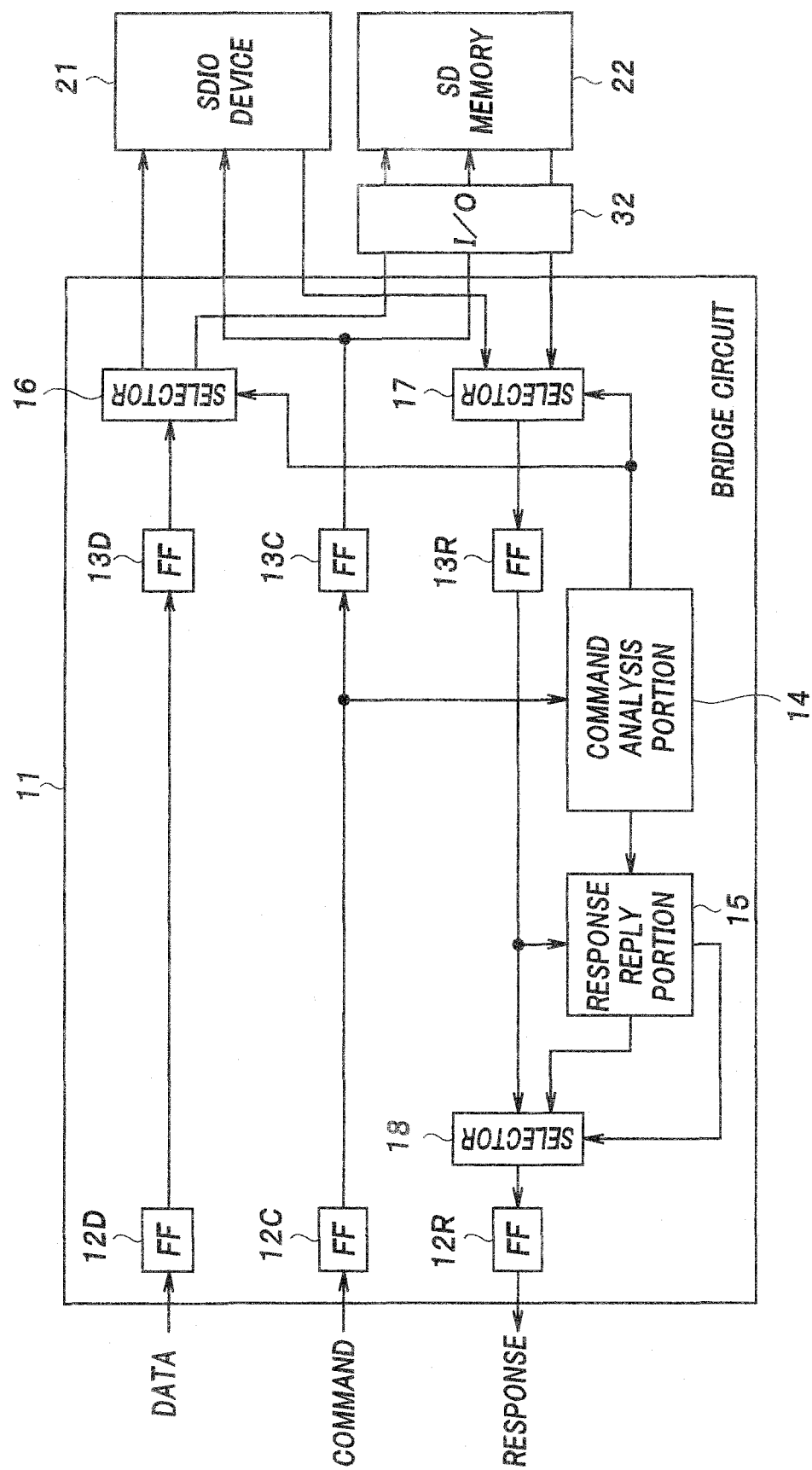
FIG. 1 is a block diagram that illustrates a bridge circuit according to a first embodiment of the present invention.
Figure 2:
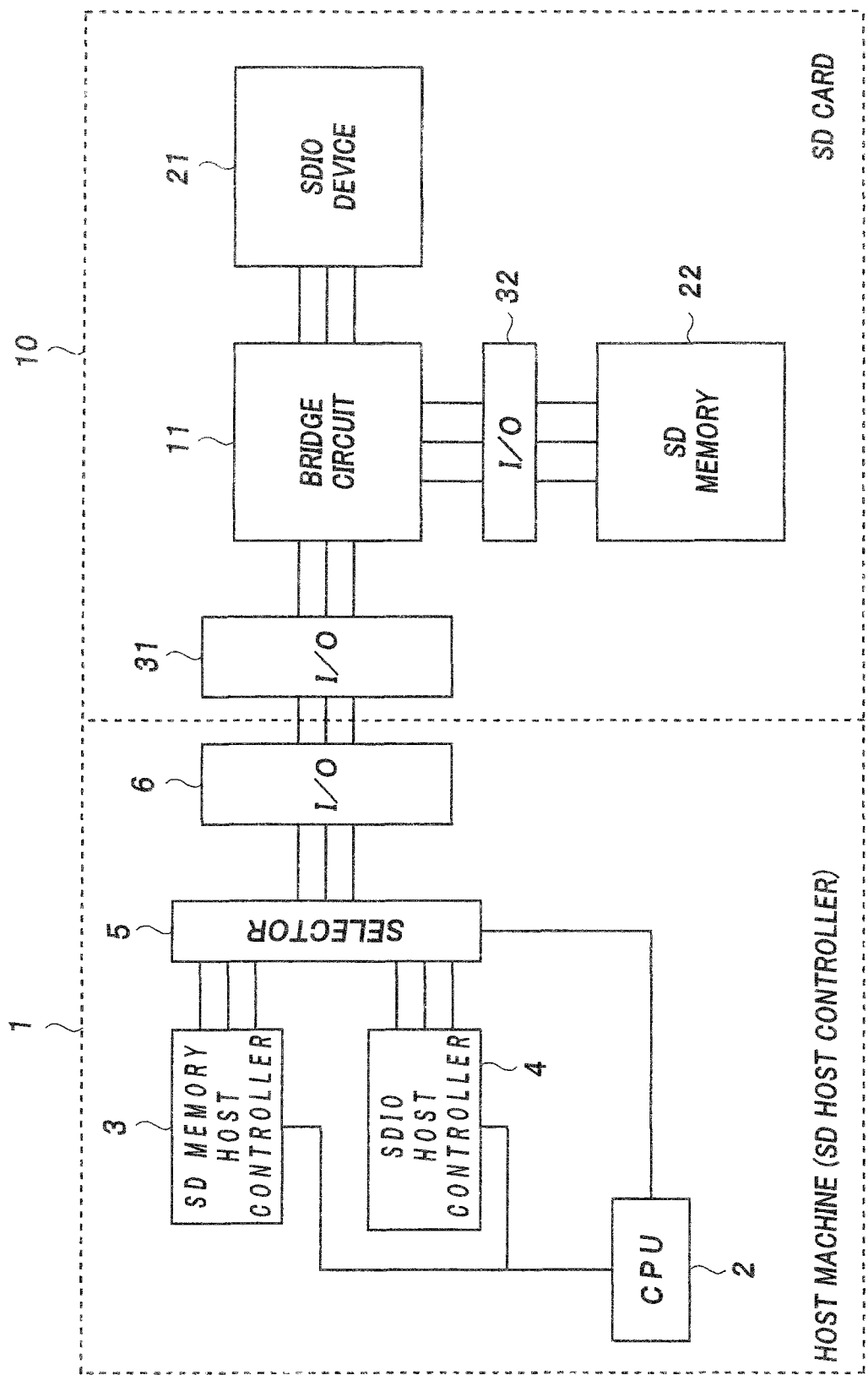
FIG. 2 is a block diagram that illustrates an SD card in which the bridge circuit shown in FIG. 1 is incorporated and an SD host controller portion of a host machine.

FIG. 1 is a block diagram illustrating a bridge circuit according to a first embodiment of the present invention. FIG. 2 is a block diagram illustrating an SD card in which the bridge circuit is incorporated and an SD host controller portion of a host machine.

In FIG. 2, an SD card 10 includes not only an SD memory 22, but also an SDIO device 21 as SD devices. The SD memory 22 is configured by an unshown memory portion that corresponds to the SD standards, and an unshown SD memory controller that controls the memory portion.

The memory portion of the SD memory 22 is configured by a flash-type memory. The SD memory controller has an unshown MPU, and also has an interface that is connected to an interface (I/O) 32. The MPU of the SD memory controller exchanges data with the I/O 32 through the interface, and writes data in the memory portion and also reads out and outputs data that is written in the memory portion.

The SDIO device 21 is configured to be conform to the SDIO technology according to the SD standards, and to implement various functions such as a Bluetooth (registered trademark) function, a wireless LAN function, a one-segment tuner function, a GPS function, a digital camera function, and a PHS data communication function. The SDIO device 21 includes an unshown function portion that implements these functions, and an unshown SDIO controller that controls the function portion.

A bridge circuit 11 that is connected to an I/O that is an input/output port of the SD card 10 is provided inside the SD card 10. The SD card 10 is configured to be removably mounted in an unshown card slot of the host machine 1. Note that the SD card 10 may also be configured as a type that is embedded in the host machine 1, and is not a removable type of SD card. When the SD card 10 is mounted in the card slot, an I/O 6 provided in the SD host controller of the host machine 1 and the I/O 31 of the SD card are connected.

An SD memory host controller 3 and an SDIO host controller 4 are provided in the SD host controller of the host machine 1, A CPU 2 of the SD host controller is configured to be capable of controlling the controllers 3 and 4. The SD memory host controller 3 outputs data that is stored in the SD memory 22, and controls write and read operations with respect to the SD memory 22. The SDIO host controller 4 controls the SDIO device 21. The SDIO host controller 4 outputs data that is necessary for implementing a function of the SDIO device 21, and also processes data from the SDIO device 21.

The CPU 2 controls a selector 5 to connect one of the SD memory host controller 3 and the SDIO host controller 4 to the I/O 6. The I/O 6 performs data exchanges with the I/O 31.

In the present embodiment the SD memory host controller 3 and the SDIO host controller 4 operate in conformity with the SD standards, and are configured so as to operate, for example, in a similar manner as the normal SD standards with respect to a timing requirement also.

In addition to being connected to the SDIO device 21, the bridge circuit 11 inside the SD card 10 is also connected to the SD memory 22 through the I/O 32, and performs data exchanges between the SDIO device 21 and the SD memory 22. That is, the bridge circuit 11 is configured so as to control data transfers so that the SD memory 22 or the SDIO device 21 can be utilized in a state in which the SD card 10 is mounted in the host machine 1.

In FIG. 1, the bridge circuit 11 includes flip-flops (hereinafter, referred to as "FF") 12D, 12C and 12R. Data from the host machine 1 is inputted through the I/O 31 to the FF 12D. A command from the host machine 1 is inputted to the FF 12C through the I/O 31. Further, the FF 12R outputs a response to the host machine 1 through the I/O 31. Note that a response line from the FF 12R is configured so as to enable transmission of responses with respect to both data and commands.

An output of the FT 12D is supplied to a selector 16 through an FF 13D. The selector 16 is controlled by a selection signal from a command analysis portion 14 that is described later, and selectively outputs data from the FF 13D to the SDIO device 21 or the SD memory 22.

An output of the FF 12C is transmitted to an FF 13C. In the present embodiment, the FF 13C is configured so as to output a command from the FF 12C to both the SDIO device 21 and the SD memory 22. That is, a command transfer in which there is a sufficiently small delay is performed in which, using two clocks, a command that is inputted to the bridge circuit 11 passes through the FF 12D and the FF 13D and is supplied to the SDIO device 21 and the SD memory 22 from the selector 16.

When a command is inputted from the FF 13C, the respective controllers of the SDIO device 21 and the SD memory 22 perform an error check with respect to the inputted command, and thereafter interpret the inputted command and perform an operation in accordance with the interpreted result. For example, the respective controllers of the SDIO device 21 and the SD memory 22 generate and output a response with respect to the inputted command.

Commands according to the SD standards differ with respect to use for the SDIO device 21 and use for the SD memory 22. The respective controllers of the SDIO device 21 and the SD memory 22 generate a correct response only in the case of a command addressed to itself. When a command is received that is not a command addressed to itself, the respective controllers of the SDIO device 21 and the SD memory 22 generate a response that indicates an illegal command has been inputted.

The responses from the respective controllers of the SDIO device 21 and the SD memory 22 are supplied to a selector 17 of the bridge circuit 11. The selector 17 is controlled by a selection signal from the command analysis portion 14, and selectively outputs a response from the SDIO device 21 or the SD memory 22 to a selector 18 and a response reply portion 15. The selector 18 also receives an output of the response reply portion 15 that is described later. The selector 18 is controlled by a selection signal from the response reply portion 15, and outputs one of the two inputs to the FF 12R. The FF 12R outputs the inputted response to the host machine 1 through the I/O 31.

In the present embodiment, a command that is captured by the FF 12C is also applied to the command analysis portion 14. According to the SD standards, commands are serially transferred. The bit configuration of commands according to the SD standards is fixed, and the command analysis portion 14 holds various kinds of command strings according to the SD standards in an unshown register. By comparing commands that are sequentially inputted and command strings stored in the register by means of a comparator, the command analysis portion 14 judges the class of commands and also judges the class of destinations that indicate which one of the SDIO device 21 and the SD memory 22 the each command is for.

The command analysis portion 14 sends a judgment result with respect to the destination class as a selection signal to the selectors 16 and 17 to control the selectors 16 and 17. The command analysis portion 14 also outputs a judgment result with respect to the command class to the response reply portion 15.

The response reply portion 15 holds dummy responses that correspond to command classes in an unshown register. The response reply portion 15 reads out, from the register, a dummy response that is in accordance with a command class received from the command analysis portion 14 and outputs the dummy response. Depending on the command class, in some cases it is not necessary for a dummy response to be generated from the response reply portion 15. The response reply portion 15 generates a selection signal that controls the selector 18 in accordance with whether or not it is necessary to generate a response. That is, when it is necessary to generate a dummy response, the response reply portion 15 causes a generated dummy response to be selectively outputted from the selector 18, and when it is not necessary to generate a dummy response, the response reply portion 15 causes a response from the FF 13R to be selectively outputted from the selector 18.

For example, a configuration is adopted such that, in a case where a timing requirement for a response according to the SD standards will not be satisfied if the response reply portion 15 waits for generation of a response from the SD device 21 or the SD memory 22, a dummy response generated by the response reply portion 15 is sent to the host machine 1.

There are also cases in which, when a response that has been sent from the SDIO device 21 or the SD memory 22 is inputted after sending a dummy response, the response reply portion 15 controls the selector 18 so as to output the aforementioned response to the host machine 1.

In addition, the response reply portion 15 has a function that reconciles responses sent from the SDIO device 21 or the SD memory 22, and sends a response after the reconciliation to the host machine 1.

In the present embodiment, a processor is not mounted in the bridge circuit 11, and the bridge circuit 11 is configured by only wired logic. It is therefore possible to supply a command from the host machine 1 to the SDIO device 21 and the SD memory 22 in an extremely short time period, and after input of a command from the host machine 1 is completed, a command class and a destination class can be obtained as an analysis result by the command analysis portion 14. Furthermore, it is also possible to generate a response in a short time period by means of the response reply portion 15.

Figure 3:
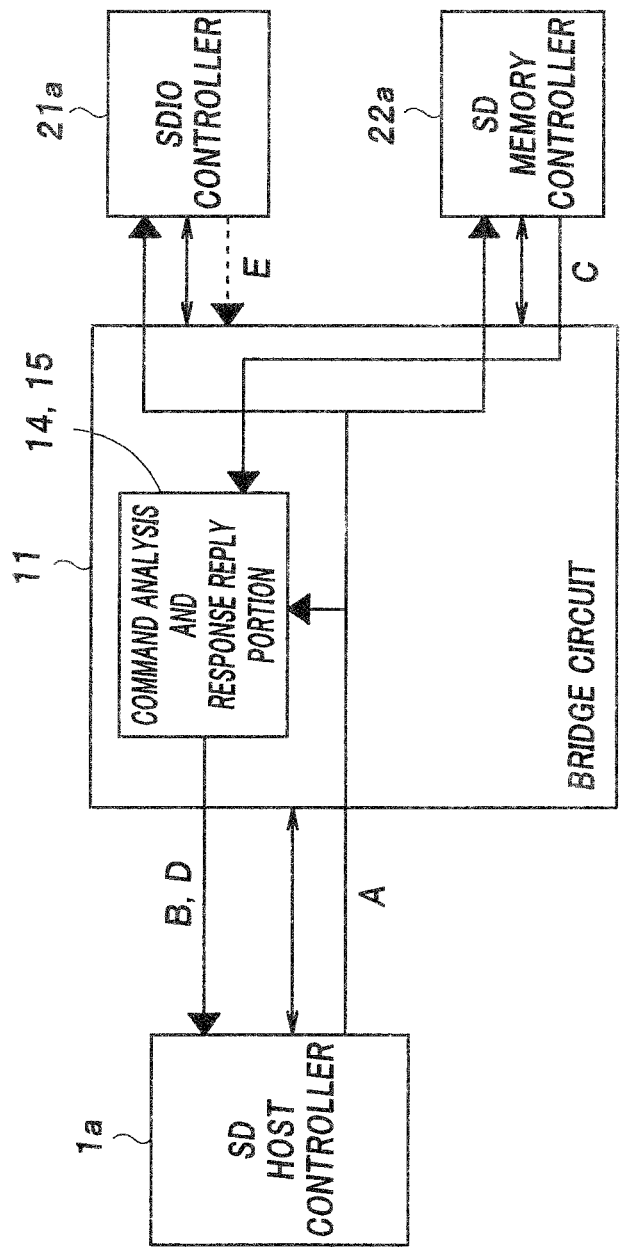
FIG. 3 is an explanatory drawing for describing operations of the first embodiment.
Figure 4:
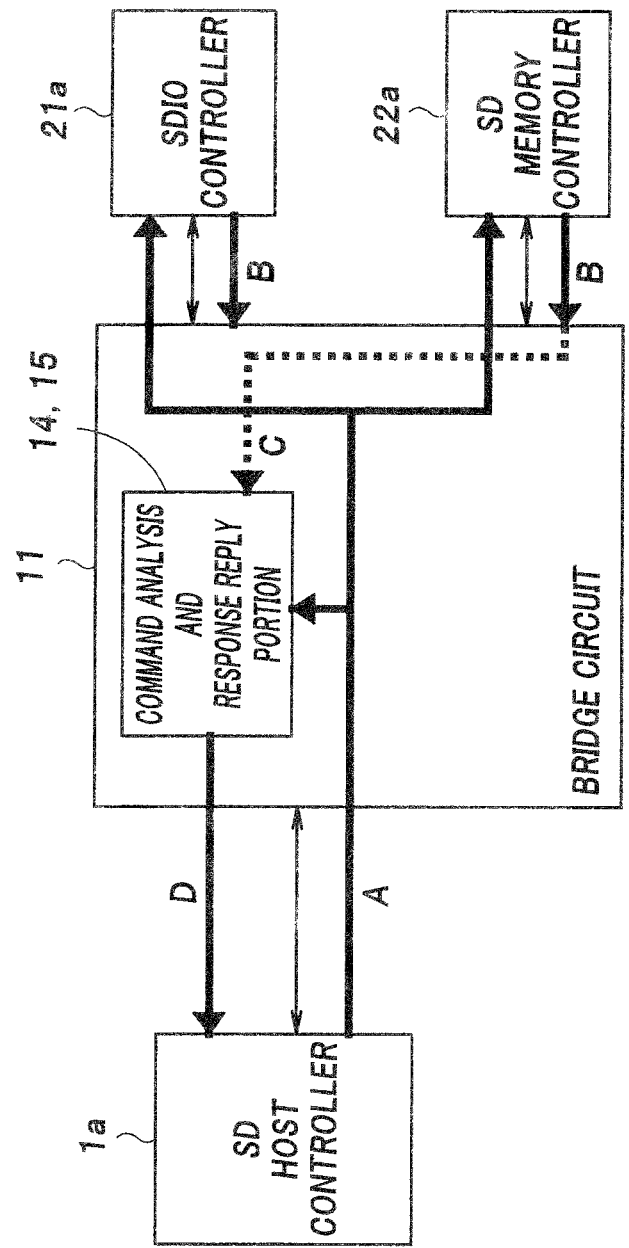
FIG. 4 is an explanatory drawing for describing operations of the first embodiment.

Next, operations of the embodiment configured as described above are described with reference to the explanatory drawings in FIG. 3 and FIG. 4. FIG. 3 and FIG. 4 are views for describing the transmission of commands and responses between an SD host controller 1a of the host machine 1, the command analysis portion 14 and response reply portion 15 of the bridge circuit 11, an SDIO controller 21a of the SDIO device 21, and an SD memory controller 22a of the SD memory 22.

When the SD card 10 is mounted in the host machine 1, the SD memory 22 and also the SDIO device 21 can be used by means of the SD host controller 1a. In this case, it is assumed that, for example, to perform a write operation or the like to the SD memory 22, a command for the SD memory 22 is generated from the SD host controller 1a of the host machine 1. As shown by an arrow A in FIG. 3, the command is transmitted from the SD host controller 1a to the SDIO controller 21a inside the SDIO device 21 and the SD memory controller 22a inside the SD memory 22 through the bridge circuit 11.

Note that, in the transmission operation indicated by the arrow A, transmission of the command is performed via the FFs 12C and 13C inside the bridge circuit 11. The bridge circuit 11 transmits the command to the SDIO controller 21a and the SD memory controller 22a without interpreting the command, and a command transmission in which there is a sufficiently small delay is enabled.

Further, in the command transmission indicated by the arrow A, the command is also transmitted to the command analysis portion 14 from the FF 12C. By comparing command strings stored in the register with the input command by means of the comparator, immediately after input of the command is completed the command analysis portion 14 outputs a judgment result with respect to the command class and the destination class.

The information regarding the command class is sent to the response reply portion 15, and the response reply portion 15 generates a response that corresponds to the command class. For example, according to the SD standards, the SD card holds CID information that is unique information of the SD card, and in some cases a command ALL_SEND_CID (CMD2) is generated from the SD host controller 1a as a command for reading out the CID information. According to the SD standards, it is required to generate a response in a comparatively short time period with respect to the command (CMD2).

The response reply portion 5 has a register that holds CID information that is the same as CID information stored in the SD memory 22, and when a command class is inputted that indicates the command (CMD2) from the command analysis portion 14, the response reply portion 15 reads out the CID information from the register and outputs the CID information as a dummy response. The response reply portion 15 controls the selector 18 to cause the selector 18 to select the aforementioned dummy response and output the dummy response to the SD host controller 1a via the FF 12R (arrow B). Thus, a response can be returned within a time period that satisfies the timing requirement of the SD standards.

In addition, for example, according to the SD standards, a maximum value and a minimum value of an operating voltage for data transmission is defined in an OCR (operation condition register) that is a register inside the card. The SD host controller 1a reads the OCR of the SD card 10 and can thereby select an operating voltage and reject an incompatible card and the like. As a command for this purpose, the SD host controller 1a transmits the command SD_SEND_OP_COND (ACMD41), According to the SD standards, it is required to generate a response in a comparatively short time period with respect to the command (ACMD41).

Therefore, according to the present embodiment, when a command class that indicates the command (ACMD41) is inputted, the response reply portion 15 generates a response "Busy" that indicates that the card is in a busy state as the dummy response. The response reply portion 15 controls the selector 18 to cause the selector 18 to select the aforementioned dummy response and output the dummy response to the SD host controller 1a via the FF 12R (arrow B). Thus, a response can be returned within a time period that satisfies the SD standards.

On the other hand, the SDIO controller 21a and the SD memory controller 22a that receive the command (ACMD41) interpret the received command and generate a response. The command (ACMD41) is a command for the SD memory, and therefore the SD memory controller 22a generates and outputs a response that corresponds to the command (ACMD41) (arrow C).

Upon determining that the command (ACMD41) is a command for the SD memory, the command analysis portion 14 causes the selectors 16 and 17 to select the SD memory 22. The command analysis portion 14 judges the destination class immediately after input of the command and controls the selectors 16 and 17 so that the response from the SD memory controller 22a is selected by the selector 17 and thereafter supplied to the selector 18 via the FF 13R.

The aforementioned response from the SD memory controller 22a is also supplied to the response reply portion 15. Upon receiving the response from the SD memory controller 22a, the response reply portion 15 causes the selector 18 to select the output of the FF 13R. As a result, the "Busy" state is released and the response from the SD memory controller 22a is supplied to the SD host controller 1a from the selector 18 via the FF 12R (arrow D).

Note that, since the command (ACMD41) is a command for the SD memory, the SDIO controller 21a generates and outputs a response indicating that an illegal command has been inputted (broken-line arrow E). The response with respect to the command (ACMD41) is not selected by the selector 17 and is not transmitted.

Note that, although an example in which a command for the SD memory 22 has been described in the foregoing, similar operations are performed in a case where a command for the SDIO device 21 is inputted, and the only difference in such case is that the selectors 16 and 17 are caused to select the SDIO device 21 by the command analysis portion 14.

In some cases, transmission of data is performed following the transmission of a command. The command analysis portion 14 controls the selector 16 in accordance with a judgment result regarding the destination class so that data for the SDIO device 21 is supplied to the SDIO device 21 and data for the SD memory 22 is supplied to the SD memory 22.

Further, although an example in which the response reply portion 15 generates a dummy response and sends the dummy response to the SD host controller 1a is illustrated in FIG. 3, in a case where there is some leeway with regard to the time period for a response reply, a configuration may be adopted in which the response reply portion 15 does not generate a dummy response, and instead waits for generation of a response from the SDIO controller 21a or the SD memory controller 22a and sends the aforementioned response to the SD host controller 1a.

Further, although in the above description an example is described in which the response reply portion 15 sends a response from the SDIO controller 21a or the SD memory controller 22a as it is to the SD host controller 1a, a configuration may also be adopted in which the response reply portion 15 reconciles responses from the SDIO controller 21a or the SD memory controller 22a and sends a response after the reconciliation to the SD host controller 1a. FIG. 4 illustrates an example of such a case. Note that in this case also the response reply portion 15 reads out a response after the reconciliation from the register in accordance with a command class and outputs the response after the reconciliation.

For example, according to the SD standards, a device (controller) is designated by a relative address RCA (relative card address) that is unique to the device (controller). It is assumed that a command SEND_RELATIVE_ADDR (CMD3) is generated from the SD host controller 1a as a command for reading out RCA information.

The command analysis portion 14 has a function that notifies information to the SDIO device in accordance with an analyzed command class. For example, with respect to the command (CMD3), the command analysis portion 14 automatically issues a command to set an RCA to the SDIO device. In addition, for example, with respect to a command (CMD6), the command analysis portion 14 notifies the bus speed to the SDIO device, and with respect to a command (ACMD6), the command analysis portion 14 notifies the bus width to the SDIO device.

As shown by an arrow A in FIG. 4, the command (CMD3) is transferred to the SDIO controller 21a and the SD memory controller 22a via the FFs 12C and 13C inside the bridge circuit 11. In this case, when it is assumed that the command (CMD3) is a command for the SD memory controller 22a, the selectors 16 and 17 select the SD memory 22 in accordance with the analysis result of the command analysis portion 14.

The SDIO controller 21a and the SD memory controller 22a output RCA information as a response to the command (CMD3) (arrows B). The response from the SD memory controller 22a is supplied to the response reply portion 15 through the selector 17 and the FF 13R (arrow C). In a case where the SD host controller 1a can only use a single relative address, the response reply portion 15 reconciles the differing addresses from the SDIO controller 21a and the SD memory controller 22a and sends a single relative address to the SD host controller 1a as the RCA information (arrow D).

Further, for example, in a case where a command to set a bus speed, a command to set a bus width, a command to make a setting to lock/unlock the card or the like is inputted also, the response reply portion 15 returns a common value as a response with respect to differing settings of the SDIO controller 21a and the SD memory controller 22a.

Thus, according to the present embodiment, the respective portions including the command analysis portion and the response reply portion are configured by non-processor-based wired logic, and commands from the host controller can be transferred to the SD memory and the SDIO device at high speed without being decoded. It is therefore possible to avoid the influence of a clock stop constraint in the SD standards. Further, the command analysis portion judges a command class and a destination class immediately after input of a command is completed, and when responses to an input command are generated from the SD memory and the SDIO device, a response can be selected in accordance with the judgment result with respect to the destination class and the response can be returned to the host controller. In addition, when it is necessary to generate a response in an extremely short time period, prior to generation of responses from the SD memory and the SDIO device, a dummy response that corresponds to the command class is generated at the response reply portion and outputted to the host controller. Therefore, even in the case an SD card that contains a plurality of SD devices compatible with the SD standards, operations that satisfy a response requirement of the SD standards can be enabled. Thus, devices that realize a plurality of functions that conform to the SD standards can be constructed inside a single SD card. Further, in a case where responses from the plurality of devices are different, it is also possible for the response reply portion to reconcile the responses and output only a single response.

Second Embodiment

Figure 5:
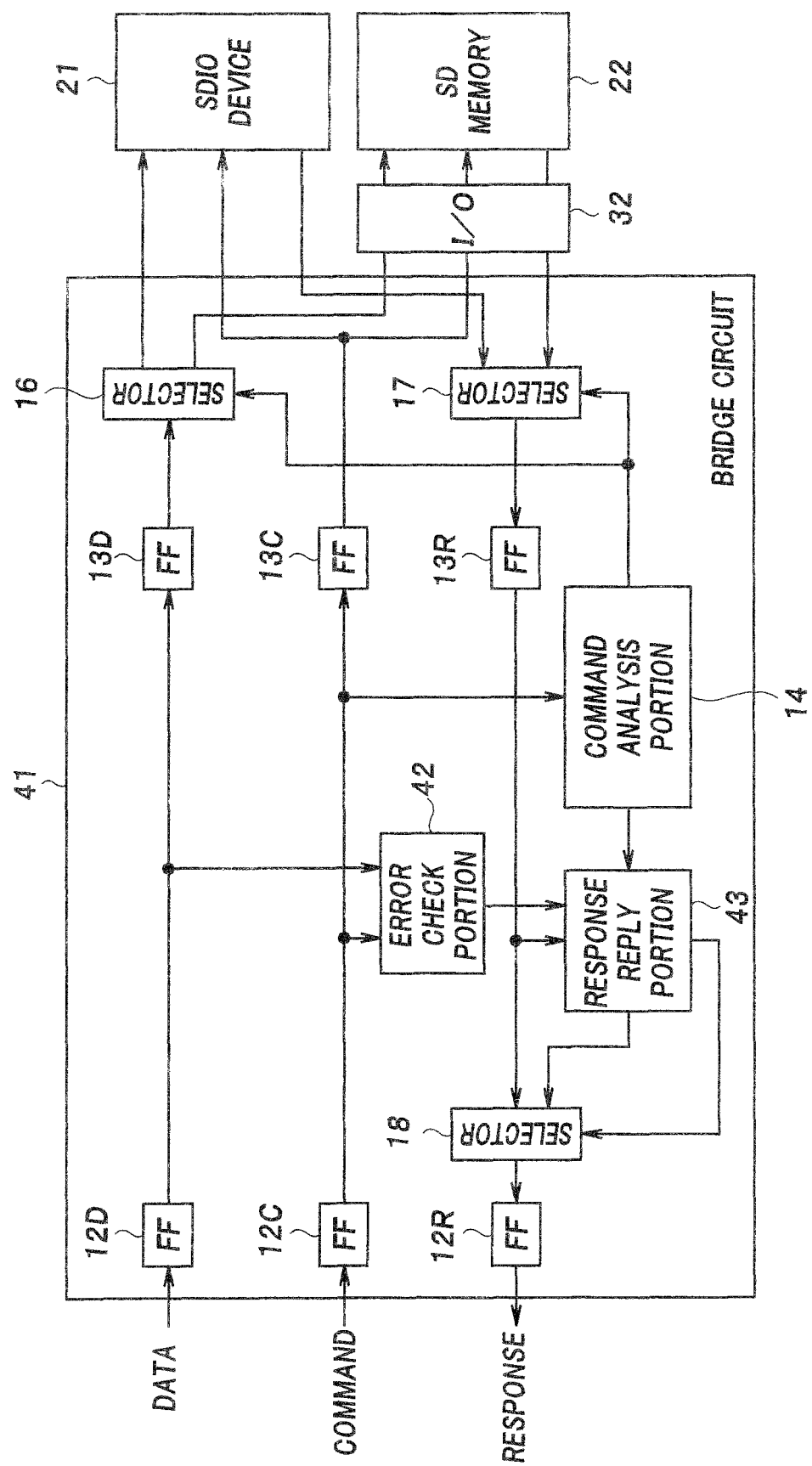
FIG. 5 is a block diagram that illustrates a second embodiment of the present invention.

FIG. 5 is a block diagram showing a second embodiment of the present invention. In FIG. 5, components that are the same as in FIG. 1 are denoted by the same reference symbols and descriptions of such components are omitted hereunder.

A bridge circuit 41 of the present embodiment differs from the bridge circuit 11 shown in FIG. 1 in the respect that an error check portion 42 is additionally provided in the bridge circuit 41 and also that a response reply portion 43 is adopted instead of the response reply portion 15. A CRC (cyclic redundancy check) symbol is added to commands and data from the SD host controller 1a (see FIG. 3), respectively. The SDIO controller 21a and the SD memory controller 22a that are provided in the SDIO device 21 and the SD memory 22, respectively, are configured so as to perform an error check using the CRC symbols and return an error check result to the SD host controller 1a as a CRC response.

However, a reply time period for a CRC response is defined in the SD standards, and it is conceivable that a CRC response requirement may not be satisfied in a case where CRC responses from the SDIO controller 21a and the SD memory controller 22a are sent to the SD host controller 1a.

Therefore, in the present embodiment the bridge circuit 41 includes the error check portion 42 for performing an error check using CRC symbols. The error check portion 42 receives a command and data via the FFs 12C and 12D, and performs a CRC error check on the command and data, respectively. The error check portion 42 outputs an error check result to the response reply portion 43.

The response reply portion 43 has the same functions as the response reply portion 15. In addition, the response reply portion 43 is configured on that, in a case where information regarding the command class from the command analysis portion 14 indicates it is necessary to return a CRC response in a short time period to satisfy a CRC response requirement, upon receiving an error check result from the error check portion 42, the response reply portion 43 sends the error check result received from the error check portion 42 to the SD host controller 1a as the CRC response.

Next, operations of the embodiment configured in the above manner are described.

In the present embodiment, similar operations as those in the first embodiment are performed with respect to command transfers, and also response transfers and data transfers with respect to a command. Here, it is assumed that commands (CMD24, 25, 27, 42, 56) or the like according to the SD standards that relate to data write transactions are sent from the SD host controller 1a.

The commands are supplied to the SDIO controller 21a and the SD memory controller 22a via the FFs 12C and 13C, and are also supplied to the command analysis portion 14. Further, according to the present embodiment, these commands are applied to the error check portion 42 and a CRC error check is performed thereon.

The error check portion 42 outputs the error check result to the response reply portion 43. The response reply portion 43 receives information regarding the command class from the command analysis portion 14. The response reply portion 43 can recognize that the commands for which an error check has been performed are commands for which it is necessary to reply in a short time period according to the CRC response requirement. In this case, the response reply portion 43 controls the selector 18 so as to send the error check result from the error check portion 42 to the SD host controller 1a as a CRC response. Thus, a reply can be made that satisfies the CRC response requirement.

Note that, when satisfying the CRC response requirement, the response reply portion 43 controls the selector 18 so as to send CRC responses from the SDIO controller 21a and the SD memory controller 22a as they are to the SD host controller 1a.

Thus, according to the present embodiment, similar advantageous effects as those of the first embodiment can be obtained, and it is also possible to make a reply that satisfies the CRC response requirement.

Figure 6:
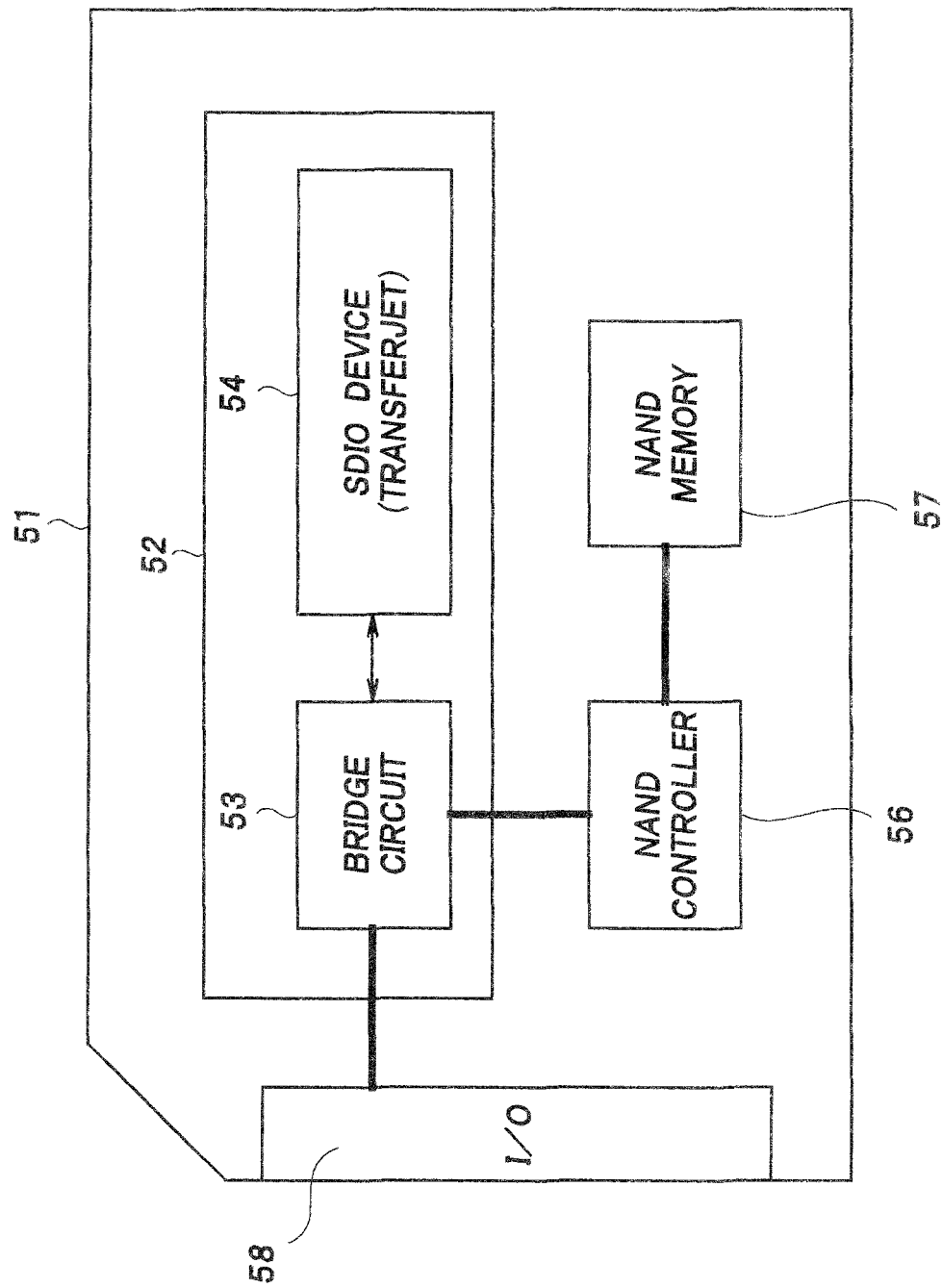
FIG. 6 is an explanatory drawing that illustrates an example of a mounting state with respect to an SD card in a case where a NAND memory is adopted as an SD memory and Transfer-Jet is adopted as an SDIO device.

FIG. 6 is an explanatory drawing that illustrates an example of a mounting state with respect to an SD card in a case where a NAND memory is adopted as an SD memory and TransferJet is adopted as an SDIO device.

A NAND controller 56 and a NAND memory 57 that constitute an SD memory device and a substrate 52 are provided in an SD card 51. A bridge circuit 53 and an SDIO device 54 constructed in chip form that constitutes the TransferJet are mounted on the substrate 52, and connected to each other. The SDIO device 54 and the NAND controller 56 are connected to an I/O 58 through the bridge circuit 53.

By employing the respective bridge circuits of the embodiments described above as the bridge circuit 53, it is possible to construct a plurality of devices such as a NAND memory and an SDIO device having a TransferJet function that conform with the SD standards inside the single SD card 51.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A bridge circuit, comprising:
a command analysis portion which is configured by wired logic and into which a host controller capable of sending a command that corresponds to each of a plurality of devices inputs the command, and which is configured to analyze the inputted command, wherein the plurality of devices conform to SD standards;
a command transfer portion which is configured by wired logic, and which is configured to simultaneously transfer the command inputted from the host controller to the plurality of devices before termination of analysis processing of the command by the command analysis portion; and
a response reply portion which is configured by wired logic, which is capable of reading out a response based on an analysis result of the command analysis portion from a response register in which a response corresponding to the command is held, and which is capable of sending the response to the host controller before a response is generated from each of the plurality of devices.

2. The bridge circuit according to claim 1, wherein the command is serially transferred.

3. The bridge circuit according to claim 1, wherein the command transfer portion comprises:
a first flip-flop configured to capture the command from the host controller; and
a second flip-flop configured to directly transfer an output of the first flip-flop to the plurality of devices.

4. The bridge circuit according to claim 1, wherein the command transfer portion is configured to complete a transfer of the command inputted from the host controller to the plurality of devices using two clocks.

5. The bridge circuit according to claim 1, wherein the command analysis portion comprises:
a command register configured to hold command strings; and
a comparator configured to compare a command string stored in the command register and a command from the host controller, and to judge a class of the command from the host controller.

6. The bridge circuit according to claim 1, further comprising a selector configured to select one of the plurality of devices in accordance with the analysis result of the command analysis portion.

7. The bridge circuit according to claim 6, wherein the selector is configured to enable a response from one of the plurality of devices to be selectively sent to the host controller.

8. The bridge circuit according to claim 6, wherein the selector is configured to enable a response from one of the plurality of devices to be selectively sent to the response reply portion.

9. The bridge circuit according to claim 6, wherein the selector is configured to selectively supply data from the host controller to one of the plurality of devices.

10. The bridge circuit according to claim 6, wherein the response reply portion is configured so that, when a response from one of the plurality of devices is selectively applied thereto through the selector, the response reply portion sends the response that is supplied through the selector to the host controller instead of the response that is read out from the response register.

11. The bridge circuit according to claim 6, further comprising an error check portion configured to perform an error check on a command from the host controller and to be capable of sending an error check result to the host controller.

12. The bridge circuit according to claim 6, wherein the command is serially transferred.

13. The bridge circuit according to claim 6, wherein the command transfer portion comprises:
a first flip-flop configured to capture the command from the host controller; and
a second flip-flop configured to directly transfer an output of the first flip-flop to the plurality of devices.

14. The bridge circuit according to claim 6, wherein the command transfer portion is configured to complete a transfer of the command inputted from the host controller to the plurality of devices using two clocks.

15. The bridge circuit according to claim 6, wherein the command analysis portion comprises:
a command register configured to hold command strings; and
a comparator configured to compare a command string stored in the command register and a command from the host controller, and to judge a class of the command from the host controller.

* * * * *